United States Patent [19]

Pott et al.

[11] Patent Number: 4,746,413
[45] Date of Patent: May 24, 1988

[54] PROCESS FOR REGENERATING AND DETOXIFYING ELECTROLYTES USED IN THE ELECTROCHEMICAL TREATMENT OF METAL

[75] Inventors: Paul G. Pott, Wermelskirchen; Wilhelm Götzelmann, Stuttgart, both of Fed. Rep. of Germany

[73] Assignee: Cohausz & Florack, Düsseldorf, Fed. Rep. of Germany

[21] Appl. No.: 936,840

[22] Filed: Dec. 2, 1986

[30] Foreign Application Priority Data

Dec. 4, 1985 [DE] Fed. Rep. of Germany ....... 3542820

[51] Int. Cl.$^4$ .............................................. C25F 3/02
[52] U.S. Cl. ............................................. 204/129.75
[58] Field of Search ..................... 204/129.75, 129.8

[56] References Cited

PUBLICATIONS

Hitzemann, Galvanotechnik (Saulgau/Wurtt) 61 (1970) Nr. 7, pp. 554–560.
Reuther, Galvanotechnik D 7968 Saulgau 63 (1972) Nr. 7, pp. 619–624.
Lutter, Metallwaren-Industrie und Galvanotechnik, Saulgau/Wttbg., Nr. 7/1958, pp. 280–298.

Primary Examiner—T. M. Tufariello
Attorney, Agent, or Firm—Dennis P. Clarke

[57] ABSTRACT

The invention comprises a process for regenerating and detoxifying electrolytes which contain sodium nitrate for use in electrochemical treatment of metallic workpieces. The reaction products, like ammonia, formed in the treatment which interfere with the operating process and in some instances are toxic shall be removed as harmless substances.

The process according to the invention is characterized by (a) adjusting the electrolyte to a pH value within the range from 4 to 5 and oxidizing the nitrite with hydrogen peroxide to the nitrate or reducing the nitrite with urea to nitrogen.

(b) raising the pH value to 11 to 12, precipitating the metal hydroxides and stripping the ammonia by passing air into the electrolyte, (c) precipitating the heavy metal hydrolisates by sedimentation, filtration and/or centrifugation, (d) neutralizing the electrolyte to a pH of 8 to 8.5.

8 Claims, 1 Drawing Sheet

Total regeneration of an electrochemical electrolyte

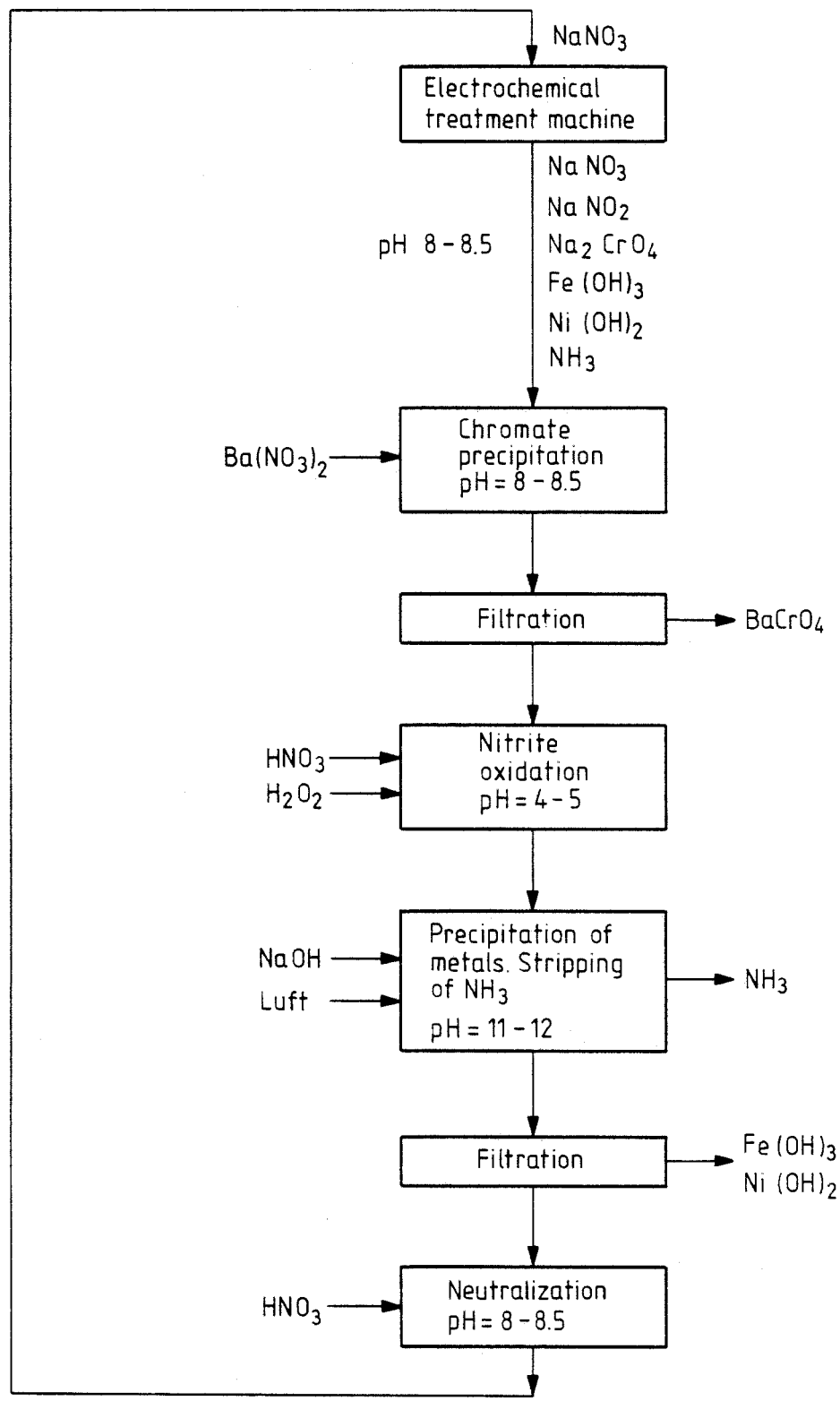
Total regeneration of an electrochemical electrolyte

PROCESS FOR REGENERATING AND DETOXIFYING ELECTROLYTES USED IN THE ELECTROCHEMICAL TREATMENT OF METAL

BACKGROUND OF THE INVENTION

The invention relates to a process for regenerating and detoxifying electrolytes which contain sodium nitrate and are used in the electrochemical treatment of metallic workpieces, wherein the reaction products formed in the treatment which interfere with the operating process and in some instances are toxic are removed as harmless substances.

In the course of the electrochemical treatment of metals by means of electrolytes based on sodium nitrate, undesirable constituents pass as reaction products into the process solution. These constituents partly come from the materials treated, but partly they are also formed by electrode reactions. For instance, cathodic reduction of the sodium nitrate of the electrolyte gives rise to sodium nitrite. If the metal to be treated contains chronium, sodium chromate is formed by anodic oxidation. Ammonia is formed by cathodic reduction of the nitrite, which had been formed in a similar electrode reaction from the nitrate. Metal hydroxides, essentially iron(III) hydroxide and nickel hydroxide, both pass into the electrolyte through the anodic removal of the material.

All the foreign substances mentioned interfere with the operating process and in some instances are toxic. For instance, chromate reduces the treatment rate wtih increase in concentration until completely seized. The action of nitrite on the operating process is likewise negative on the operating process. In addition, nitrite is toxic and by law must not be allowed to pass into the waste water. The metal hydrolysates from the workpieces interfere very considerably with the treatment process from certain concentrations onward, by being able to form deposits on the edges of tools and workpieces and to lead to reductive residues on the cathodes, thereby producing short circuits which result in the destruction of the expensive tools. The ammonia formed by cathodic reduction of the nitrite formed in the same way passes into the air breathed by the operating personnel and can lead to delicate health problems among them.

It is an object of the present invention to provide a process of the type mentioned at the beginning with which it is possible to regenerate the electrolyte without forming harmful substances.

This object is not achieved by the process known from German Pat. No. 3,303,585, wherein the nitrite is oxidized by means of ozone. This process is costly, for one thing, and not workable without environmental pollution or without special precautions on account of the toxic action of ozone. In addition, this publication deals only with the removal of nitrite.

SUMMARY OF THE INVENTION

The stated object is achieved according to the invention with a process which is characterized by the following measures:

(a) adjusting the electrolyte to a pH value within the range from 4 to 5 and oxidizing the nitrite to the nitrate or reducing the nitrite to nitrogen, (b) raising the pH value to 11 to 12, precipitating the metal hydroxides and stripping the ammonia by passing air into the electrolyte, (c) precipitating the heavy metal hydrolisates by sedimentation, filtration and/or centrifugation, (d) neutralizing the electrolyte to a pH value of 8 to 8.5.

The process according to the invention, in the regeneration of electrolyte, does not form any harmful or toxic compounds which require detoxification before passing into the waste water. By precipitating the chromate and by detoxifying the nitrite these two toxic substances do not even pass into the waste water. It is thus possible to dispense with costly detoxifying measures which would have to be carried out separately. Nor does the stripping of ammonia expose the operating personnel to any danger.

The process according to the invention is directed towards a total regeneration of the electrolytes for the electrochemical treatment of metallic materials with simultaneous detoxification of toxic substances. Only substances which contribute to the formation of sodium nitrate are added, so that no foreign substances pass into the electrolyte.

DETAILED DESCRIPTION OF THE INVENTION

Chromate precipitation

Readily soluble barium nitrate is added at the bath pH of 8 to 8.5, and sparingly soluble barium chromate precipitates. This reaction proceeds in accordance with the following equation:

$$CrO_4^{--} + Ba(NO_3)_2 \rightarrow BaCrO_4 + 2NO_3^- \quad (1)$$

The barium chromate is subsequently filtered off. If the precipitate is very finely dispersed and filtration presents problems, it is possible additionally to add a little iron(III) nitrate, which immediately hydrolyses to form the sparingly soluble iron(III) hydroxide. This hydroxide absorbs finely dispersed particles and/or includes them in its voluminous precipitate, which is sedimentable and filterable.

If the workpiece to be treated contains no chromate, this treatment step can be dispensed with.

Nitrile oxidation

The electrolyte is initially acidified to pH 4–5 with nitric acid. Hydrogen peroxide is then added to convert the nitrite back into the desired nitrate. At the indicated pH value the reaction proceeds very rapidly and completely in accordance with the following equation:

$$NO_2^- + H_2O_2 \rightarrow NO_3^- + H_2O \quad (2)$$

The nitrite oxidation can be replaced by a

Nitrite reduction

After the electrolyte has been acidified with nitric acid to pH 4–5, the nitrite can be detoxified by adding urea. The nitrite then decomposing to nitrogen, carbon dioxide and water.

Ammonia removal

The pH is raised from 4–5 to 11–12 with sodium hydroxide solution. The ammonia produced in the process can be easily removed in gaseous form at the elevated pH by passing in air. This process of stripping removes the ammonia from the equilibrium, so that it likewise dissociates out of the nickel hexammine, and the complexed nickel precipitates in the form of the hydroxide in accordance with the following equation:

$$[Ni(HN_3)_6]^{++} + 2NaOH \rightarrow Ni(OH)_2 + 2Na^+ + 6NH_3 \qquad (3)$$

Removal of metals

At the elevated pH value of 11 to 12, the metals, some of which have been dissolved, are now precipitated as metal hydroxides, while the iron(III) hydroxide was already present as a hydroxide in the electrolyte obtained, this is not the case with nickel, which is only completely precipitatable at pH values above 9.5. The hydroxides are precipitated in accordance with the following equations:

$$Fe^{+++} + 3OH^- \rightarrow Fe(OH)_3 \qquad (4)$$

$$Ni^+ + 2OH^- \rightarrow Ni(OH)_2 \qquad (5)$$

The nickel combines with the ammonia present to form a readily soluble complex, namely nickel hexammine.

The metals present as hydroxides can now be filtered off. If no or only little iron is present, the flocculations cannot be effected here with iron nitrate.

Neutralization

The alkaline electrolyte is neutralized with nitric acid back to a pH value between 8 and 8.5 in accordance with the following equation:

$$NaOH + HNO_3 \rightarrow NaHO_3 + H_2O \qquad (6)$$

The elctrolyte is then resupplied to the treatment machine.

The following possibilities exist for automatic control of regeneration and detoxification.

Chromatic precipitation

At the equivalence point of the precipitation the chromate disappears from the solution, so that, if a redox potential measurement is applied, the potential jumps in the direction of more negative values. A suitable measuring chain comprises a combination of platinum or gold electrode and one of the known reference electrodes (calomel electrode, silver/silver chloride electrode).

Nitrite oxidation

A pH value between 4 and 5 can very easily be established by measuring the pH value, most suitably with a combined glass and reference electrode. At the equivalence point of the oxidation with hydrogen peroxide the pH deflects instantaneously into the lower range. This can be used to control the metering of the oxidizing agent.

Precipitation of metals and stripping of ammonia

The alkalization of the solution to a pH value of 10 to 12 can be controlled via the same pH measuring electrode as mentioned above. The subsequent stripping with air is carried out for a predetermined time which has been empirically determined once for the system.

Neutralization

The setting of the pH value of the original electrolyte is again effected with nitric acid using the same pH measurement system as mentioned above.

Filtrations

If the addition of a flocculant is necessary, this is done with time control via a metering pump. The time course for the filtration can be different. But its end can be determined by level measurement in the receiving vessel for the filtrate. If the depth of liquid to be expected has been reached, the next treatment stage is initiated.

In many processes the addition of a flocculating aid before the filtration is known not to be disadvantageous. In such cases its use is possible for speeding up the filtration or a presedimentation.

The course of the process according to the invention is schematically depicted in the accompanying flow diagram.

We claim:

1. A method for regenerating and detoxifying electrolytes which contain sodium nitrate and are used in electrochemical treatment of metallic workpieces, wherein reaction products, formed during the treatment, which interfere with the treatment or are toxic are removed as harmless substances by:
   (a) adjusting the electrolyte to a pH value within the range from 4 to 5 and oxidizing the nitrite with hydrogen peroxide to the nitrate;
   (b) raising the pH value to 11 to 12, precipitating the metal hydroxides and stripping the ammonia produced by said treatment by passing air into the electrolyte;
   (c) precipitating the heavy metal hydrolisates; and
   (d) neutralizing the electrolyte to a pH value of 8 to 8.5.

2. A method according to claim 1 wherein, before the oxidation of the nitrite, readily soluble barium nitrate is added to the electrolyte and the resulting sparingly soluble barium chromate is precipitated and removed from the electrolyte.

3. A method according to claim 1, wherein ferric nitrate is added before the metal hydroxides are precipitated.

4. A method according to claim 1, wherein flocculation aids are also added.

5. A method for regenerating and detoxifying electrolytes which contain sodium nitrate and are used in electrochemical treatment of metallic workpieces, wherein reaction products, formed during the treatment, which interfere with the treatment or are toxic are removed as harmless substances by:
   (a) adjusting the electrolyte to a pH value within the range from 4 to 5 and reducing the nitrite with urea to nitrogen;
   (b) raising the pH value to 11 to 12, precipitating the metal hydroxides and stripping the ammonia produced by said treatment by passing air into the electrolyte;
   (c) precipitating the heavy metal hydrolisates; and
   (d) neutralizing the electrolyte to a pH value of 8 to 8.5.

6. A method according to claim 5 wherein, before the reduction of the nitrite, readily soluble barium nitrate is added to the electrolyte and the resulting sparingly soluble barium chromate is precipitated and removed from the electrolyte.

7. A method according to claim 5, wherein ferric nitrate is added before the metal hydroxides are precipitated.

8. A method according to claim 5, wherein flocculation aids are also added.

* * * * *